United States Patent
Lipcon

(10) Patent No.: US 11,899,937 B2
(45) Date of Patent: Feb. 13, 2024

(54) MEMORY ALLOCATION BUFFER FOR REDUCTION OF HEAP FRAGMENTATION

(71) Applicant: Cloudera, Inc., Palo Alto, CA (US)

(72) Inventor: Todd Lipcon, San Francisco, CA (US)

(73) Assignee: Cloudera, Inc., Santa Clara, CA (US)

( * ) Notice: Subject to any disclaimer, the term of this patent is extended or adjusted under 35 U.S.C. 154(b) by 746 days.

(21) Appl. No.: 16/807,226

(22) Filed: Mar. 3, 2020

(65) Prior Publication Data
US 2020/0249848 A1  Aug. 6, 2020

Related U.S. Application Data

(63) Continuation of application No. 15/411,634, filed on Jan. 20, 2017, now Pat. No. 10,613,762, which is a
(Continued)

(51) Int. Cl.
| | |
|---|---|
| G06F 12/00 | (2006.01) |
| G06F 3/06 | (2006.01) |
| G06F 16/17 | (2019.01) |
| H04L 67/1097 | (2022.01) |
| G06F 12/0808 | (2016.01) |
| G06F 12/128 | (2016.01) |
| G06F 12/12 | (2016.01) |

(52) U.S. Cl.
CPC ............ G06F 3/0611 (2013.01); G06F 3/067 (2013.01); G06F 3/0631 (2013.01); G06F 3/0644 (2013.01); G06F 3/0652 (2013.01); G06F 3/0683 (2013.01); G06F 12/0808 (2013.01); G06F 12/128 (2013.01); G06F 16/1727 (2019.01); H04L 67/1097 (2013.01); G06F 12/12 (2013.01); G06F 2212/1044 (2013.01)

(58) Field of Classification Search
CPC .... G06F 3/0611; G06F 3/0631; G06F 3/0644; G06F 3/0652
USPC .......................................................... 711/170
See application file for complete search history.

(56) References Cited

U.S. PATENT DOCUMENTS

| | | |
|---|---|---|
| 5,825,877 A | 10/1998 | Dan et al. |
| 6,678,828 B1 | 1/2004 | Pham et al. |

(Continued)

OTHER PUBLICATIONS

United States Patent and Trademark Office, Trademark Status & Document Retrieval (TSDR), HBase trademark registration webpage, page was generation.

(Continued)

*Primary Examiner* — Mohamed M Gebril
(74) *Attorney, Agent, or Firm* — Perkins Coie LLP

(57) ABSTRACT

Systems and methods of a memory allocation buffer to reduce heap fragmentation. In one embodiment, the memory allocation buffer structures a memory arena dedicated to a target region that is one of a plurality of regions in a server in a database cluster such as an HBase cluster. The memory area has a chunk size (e.g., 2 MB) and an offset pointer. Data objects in write requests targeted to the region are received and inserted to the memory arena at a location specified by the offset pointer. When the memory arena is filled, a new one is allocated. When a MemStore of the target region is flushed, the entire memory arenas for the target region are freed up. This reduces heap fragmentation that is responsible for long and/or frequent garbage collection pauses.

24 Claims, 11 Drawing Sheets

Related U.S. Application Data continuation of application No. 14/846,413, filed on Sep. 4, 2015, now Pat. No. 9,552,165, which is a continuation of application No. 13/745,461, filed on Jan. 18, 2013, now Pat. No. 9,128,949.

(60) Provisional application No. 61/588,036, filed on Jan. 18, 2012.

(56) References Cited

U.S. PATENT DOCUMENTS

| | | | |
|---|---|---|---|
| 6,931,530 B2 | 8/2005 | Pham et al. | |
| 6,968,557 B1* | 11/2005 | Zhang | G06F 9/4484 |
| | | | 711/119 |
| 7,143,288 B2 | 11/2006 | Pham et al. | |
| 7,685,360 B1* | 3/2010 | Brunnett | G06F 3/0608 |
| | | | 711/112 |
| 7,688,727 B1* | 3/2010 | Ferguson | H04L 67/1001 |
| | | | 370/230.1 |
| 7,716,192 B2* | 5/2010 | Petrank | G06F 12/0269 |
| | | | 707/816 |
| 8,006,064 B2 | 8/2011 | Li et al. | |
| 8,024,560 B1 | 9/2011 | Alten | |
| 8,306,919 B2 | 11/2012 | Sakamura et al. | |
| 8,667,267 B1 | 3/2014 | Garcia et al. | |
| 8,788,815 B1 | 7/2014 | Garcia et al. | |
| 8,821,602 B2 | 9/2014 | McAlister | |
| 8,954,385 B2 | 2/2015 | George et al. | |
| 9,128,949 B2 | 9/2015 | Lipcon | |
| 9,552,165 B2 | 1/2017 | Lipcon | |
| 10,613,762 B2 | 4/2020 | Lipcon | |
| 2001/0044795 A1 | 11/2001 | Cohen et al. | |
| 2002/0073322 A1 | 6/2002 | Park et al. | |
| 2003/0037034 A1 | 2/2003 | Daniels et al. | |
| 2005/0055357 A1 | 3/2005 | Campbell | |
| 2005/0171983 A1 | 8/2005 | Deo et al. | |
| 2005/0172067 A1 | 8/2005 | Sinclair | |
| 2005/0182749 A1 | 8/2005 | Matsui | |
| 2005/0273654 A1* | 12/2005 | Chen | G06F 11/2082 |
| | | | 714/13 |
| 2006/0020616 A1 | 1/2006 | Hardy et al. | |
| 2006/0050877 A1 | 3/2006 | Nakamura | |
| 2006/0059309 A1* | 3/2006 | Harada | G06F 12/0893 |
| | | | 711/E12.056 |
| 2006/0143453 A1 | 6/2006 | Imamoto et al. | |
| 2006/0156018 A1 | 7/2006 | Lauer et al. | |
| 2007/0050535 A1* | 3/2007 | Nelson | G06F 12/0246 |
| | | | 711/E12.008 |
| 2007/0177737 A1 | 8/2007 | Jung et al. | |
| 2007/0180255 A1 | 8/2007 | Hanada et al. | |
| 2007/0186112 A1 | 8/2007 | Perlin et al. | |
| 2007/0226488 A1 | 9/2007 | Lin et al. | |
| 2007/0255943 A1 | 11/2007 | Kern et al. | |
| 2009/0031096 A1* | 1/2009 | Smith | G06F 11/2092 |
| | | | 711/E12.103 |
| 2009/0187614 A1* | 7/2009 | Clee | G06F 12/0253 |
| | | | 718/1 |
| 2009/0259838 A1 | 10/2009 | Lin | |
| 2009/0307783 A1 | 12/2009 | Maeda et al. | |
| 2010/0008509 A1 | 1/2010 | Matsushita et al. | |
| 2010/0042799 A1* | 2/2010 | Printezis | G06F 12/0269 |
| | | | 711/170 |
| 2010/0198972 A1 | 8/2010 | Umbehocker | |
| 2010/0296652 A1 | 11/2010 | Nakayama et al. | |
| 2010/0325713 A1 | 12/2010 | Kurita et al. | |
| 2011/0022817 A1* | 1/2011 | Gaster | G06F 9/5044 |
| | | | 711/202 |
| 2011/0055578 A1 | 3/2011 | Resch | |
| 2011/0078549 A1 | 3/2011 | Thueringer et al. | |
| 2011/0167421 A1 | 7/2011 | Soundararajan et al. | |
| 2011/0276495 A1 | 11/2011 | Varadarajan et al. | |
| 2011/0276776 A1* | 11/2011 | Ylonen | G06F 12/0292 |
| | | | 711/E12.001 |
| 2011/0296123 A1 | 12/2011 | Adler et al. | |
| 2011/0302417 A1 | 12/2011 | Whillock et al. | |
| 2012/0036357 A1 | 2/2012 | Struik | |
| 2012/0072656 A1 | 3/2012 | Archak et al. | |
| 2012/0102245 A1* | 4/2012 | Gole | G06F 13/4022 |
| | | | 710/72 |
| 2012/0130874 A1 | 5/2012 | Mane et al. | |
| 2012/0131341 A1 | 5/2012 | Mane et al. | |
| 2012/0185666 A1* | 7/2012 | Channabasappa | G06F 16/24539 |
| | | | 711/E12.001 |
| 2013/0054976 A1 | 2/2013 | Brown et al. | |
| 2014/0344530 A1* | 11/2014 | Sayyaparaju | G06F 16/176 |
| | | | 711/153 |
| 2014/0359044 A1 | 12/2014 | Davis et al. | |

OTHER PUBLICATIONS

Cheng, Security Attack Safe Mobil and Cloud-Based One-Time Password Tokens Using Rubbing Encryption Algorithm, ACM, Jun. 2011, pp. 304-336.

Du et al., "A Pairwise Key Predistribution Scheme for Wireless Sensor Networks," ACM, May 2005, vol. 8 Issue 2, pp. 228-258.

Gordon et al., "Low-latency catching for cloud-based web applications," Proceedings of the 6th International Workshop on Networking Meets Databases (NetDB 11), Athens, Greece, Jun. 12, 2011.

Kim et al., Design and Implementation of a Private and Public Key Crypto Processor and Its Application to a Security System, IEEE, Feb. 2004, vol. 50, Issue 1, pp. 214-224.

Ko et al., "A Study of Encryption Algorithm for RFID tag (SEED: 8 Rounds X 64 bit block)," IEEE, s008, pp. 672-677.

Lamport, L., "Time, clocks, and the ordering of events in a distributed system," Communications of the ACM, vol. 21, No. 7, pp. 558-565, Jul. 1978.

Babaoglu, O., and K. Marzullo, "Consistent global states of distributed systems: Fundamental concepts and mechanisms," Distributed Systems, 53 pages, Jan. 1993.

* cited by examiner

MEMORY ALLOCATION BUFFER FOR REDUCTION OF HEAP FRAGMENTATION

CROSS-REFERENCE TO RELATED APPLICATION(S)

The present application is a continuation of U.S. patent application Ser. No. 15/411,634 titled "Memory Allocation Buffer for Reduction of Heap Fragmentation," filed Jan. 20, 2017, now U.S. Pat. No. 10,613,762, which is a continuation of U.S. patent application Ser. No. 14/846,413, titled "Memory Allocation Buffer for Reduction of Heap Fragmentation," filed Sep. 4, 2015, now U.S. Pat. No. 9,552,165, which is a continuation of U.S. patent application Ser. No. 13/745,461, titled "Memory Allocation Buffer for Reduction of Heap Fragmentation," filed Jan. 18, 2013, now U.S. Pat. No. 9,128,949, and claims priority to and benefit from U.S. Provisional Patent Application Ser. No. 61/588,036 titled "Memory Allocation Buffers For Reduction Of Heap Fragmentation", filed on Jan. 18, 2012, the content of each application being incorporated by reference herein.

BACKGROUND

The amount of memory available on inexpensive commodity servers has dramatically increased. For example, when Apache databases such as HBase project started, typical machines running Hadoop had 4-8 GB of random-access memory (RAM). Now, users and customers run with at least 24 G of RAM, and larger amounts like 48 G, 72 G, or even larger are becoming common as costs continue to come down. On the surface, this new memory capacity appears to be advantageous to latency-sensitive databases like HBase, where with a lot of RAM, more data can fit in cache which can avoid expensive disk seeks on reads, and more data can fit in the MemStore, or the memory area that buffers write to before they flush to disk.

In practice, however, as heap sizes for databases have increased, the garbage collection methods and/or systems available in production-quality Java Development Kits (JDKs) have remained largely the same. This has resulted in longer garbage collection pauses. Long garbage collection pauses can result in latency when client requests are stalled and other issues in the system.

DETAILED DESCRIPTION

Figure 1:
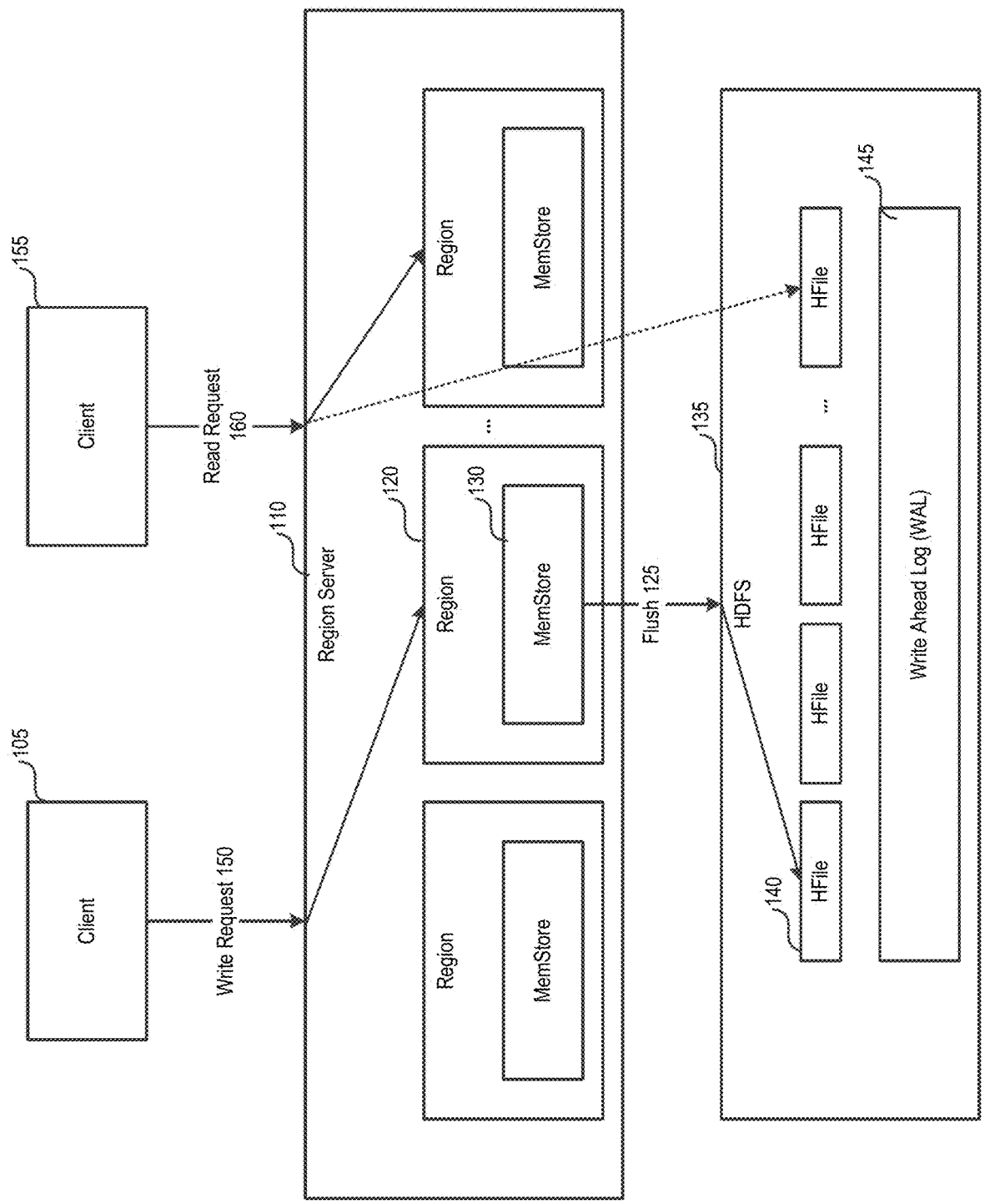
FIG. 1 depicts example read and write paths in a distributed database system.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for memory allocation buffering to reduce heap fragmentation.

As typical heap sizes for databases such as HBase have crept up, the garbage collection methods and/or systems available in production-quality Java Development Kits (JDKs) have remained largely the same. The inefficiencies of the existing garbage collection methods and/or systems and the continued growth of heap sizes has led to lengthy stop-the-world collection pauses for users of the distributed databases. In one embodiment, the systems and methods described herein reduce the frequency of lengthy stop-the-world garbage collection pauses in distributed databases such as HBase.

During a stop-the-world garbage collection pause, any client requests to databases such as HBase are stalled, causing user-visible latency or even timeouts. If a request takes over a minute to respond because of a collection pause, databases such as HBase may as well be considered as being down or unavailable, since there is often little value in such a delayed response.

Databases such as HBase can rely on central configuration services or naming registries (e.g., Apache ZooKeeper) to track cluster membership and live status or liveness. If a server pauses for a significant amount of time, it may be unable to send heartbeat ping messages to the ZooKeeper quorum, and the rest of the servers presume that the server has died. This causes the master to initiate certain recovery processes to account for the presumed-dead server. When the server comes out of its pause, it finds all of its leases revoked, and can no longer respond to requests. This scenario can be called a Juliet pause, since the master (Romeo) presumes the region server (Juliet) is dead when it is really just sleeping, and thus takes some drastic action (recovery).

These issues are generally encountered during load testing of database clusters (e.g., HBase cluster). On some hardware, the pause can last, for example, as long as 8-10 seconds per GB of heap. For a 8 G heap, the pause may be upwards of a minute long. No matter how much tuning one might do, the problem of long collection pauses is unavoidable in many databases, including, for example, HBase 0.90.0 or older implementing production-ready garbage collectors. In one embodiment, the systems and methods described herein reduces or eliminates the lengthy stop-the-world garbage collection pauses in distributed databases including but not limited to HBase.

Example: Java Garbage Collection (GC)

Various garbage collection techniques are available in Java.

In one example, Java's generational garbage collector operates in a generational mode, relying on an assumption called the generational hypothesis. The generational hypothesis assumes that most objects are either short lived, or "survive" for quite a long time. For example, the buffers used in processing a remote procedure call (RPC) request only last for a few milliseconds, whereas the data in a cache or the data in HBase MemStore, for example, may likely "survive" for many minutes.

Given that objects have two different lifetime profiles, different garbage collection methods and/or systems are may perform better on one profile than another. So, the heap can be split up into two generations based on object age: the young (or new) generation and the old generation (or tenured objects or comprising of tenured objects from the "young generation" that survive minor garbage collection). When objects are allocated, the objects start in the young generation, where an algorithm that operates efficiently when most of the data is short-lived is selected. If an object "survives" several collections inside the "young generation," the object can then be tenured and is thus relocated into the old generation in memory, where the data is likely to persist for a long time.

In latency-sensitive workloads like HBase, for example, the −XX:+UseParNewGC and −XX:+UseConcMarkSweepGC JVM flags may be used. These flags enable the Parallel New collector for objects in the young generation and the Concurrent Mark-Sweep collector for the objects in the old generation.

The Parallel New collector is a stop-the-world copying collector. Whenever it runs, it first stops the world, suspending all Java threads. Then, it traces object references to determine which objects are live (i.e., still referenced by the program). It then moves the live objects over to a free section of the heap and updates any pointers into those objects to point to the new addresses. The parallel new collector stops or pauses every thread, but not for very long. Because the young generation is usually fairly small, and the collector runs with many threads, it can accomplish tasks quickly. For production workloads, a young generation is typically for example, no larger than 512 MB, which generally results in pauses of less than a few hundred or tens of milliseconds at the worst case.

The parallel new collector copies the live objects into a free heap area. This has the side effect of compacting the free space, such that after every collection, the free space in the young generation is one contiguous chunk. This arrangement of free space allows efficient allocation. Each time the Parallel New collector copies an object, it can increment a counter for that object. After an object has been copied around in the young generation several times, the system decides that the object belongs to the long-lived class of objects, and moves the object to the old generation (i.e., tenures the object) memory. The number of times an object is copied inside the young generation before being tenured is called the tenuring threshold. The tenuring threshold can be adjusted, modified, configured based on the application, availability of resources and configured or reconfigured dynamically.

The parallel new collector tenures some objects into the old generation every time it runs. The tenuring of objects can cause the old generation to eventually fill up. The Concurrent-Mark-Sweep collector (CMS) can clear dead objects in the old generation. The CMS collector operates in a series of phases. Some phases stop the world, and others run concurrently with the Java application. The phases can include: an initial-mark (stops the world), a concurrent-mark (concurrent), a remark (stops the world) and a concurrent-sweep (concurrent).

In the initial-mark phase, the CMS collector places a mark on the root objects. A root object is something directly referenced from a live thread, for example, the local variables in use by that thread. The initial-mark phase is short because the number of roots is very small.

In the concurrent-mark phase, the collector follows every pointer starting from the root objects until it has marked all live objects in the system.

Since objects might have had references changed, and new objects might have been created during concurrent-mark, the system goes back and takes the changed or new objects into account in the remark phase. The remark phase is short because a special data structure allows inspection of only those objects that were modified during the prior phase.

In the concurrent-sweep phase, the system proceeds through all objects in the heap. Any object without a mark is collected and considered free space. New objects allocated during this time are marked as they are created so that they are not accidentally collected.

It should be noted that the stop-the-world phases can be made to be very short. The operation of scanning the heap and removing the dead objects happens concurrently. The CMS collector does not relocate the live objects, so free space can be spread in different chunks throughout the heap.

However, the CMS collector has two failure modes which can cause long pauses when databases such as HBase is run under heavy load with large heaps. The first failure mode is the concurrent mode failure. For example, suppose that there is an 8 GB heap. When the heap is 7 GB full, the CMS collector may begin its first phase, and move along with the concurrent-mark phase. Meanwhile, more data is being allocated and tenured into the old generation memory. If the tenuring rate is too fast, the old generation may completely fill up before the collector is done marking. At that point, the system may not proceed because there is no free space or insufficient to tenure more objects. The collector then aborts its concurrent work and fall back to a stop-the-world single-threaded copying collection method and/or system. This system relocates all live objects to the beginning of the heap, and frees up all of the dead space. After the long pause, the program may proceed.

The above problem can be avoided by tuning. The collector can be configured to start its work earlier. Thus, it is less likely that it will get overrun with new allocations before it is done with its collection. This is tuned by setting—XX:CMSInitiatingOccupancyFraction=N where N is the percent of heap at which to start the collection process. The databases such as HBase region server carefully accounts its memory usage to stay within 60% of the heap, so the value of N can be set to around 70.

The second mode of failure is the promotion failure due to fragmentation. The CMS collector does not relocate objects, but simply tracks all of the separate areas of free space in the heap. If, for example, a system allocates 1 million objects, each 1 KB, for a total usage of 1 GB in a heap that is exactly 1 GB. Then every odd-numbered object can be freed up to yield 500 MB live. However, the free space will be solely made up of 1 KB chunks. If a 2 KB object is to be allocated, there is nowhere to put it, even though there is 500 MB of space free. This is termed memory fragmentation. No matter how early CMS collector is requested to start, since it does not relocate objects, it cannot solve this problem. When this problem occurs, the collector again falls back to the copying collector, which is able to compact all the objects and free up space.

Garbage Collection in Databases such as HBase

MemStore in Databases such as HBase

In order to store a very large dataset distributed across many machines, Apache databases such as HBase partitions each table into segments called Regions. Each region has a designated "start key" and "stop key," and contains every row where the key falls between the two. This scheme can be compared to primary key-based range partitions in a relational database management system (RDBMS), though databases such as HBase manage the partitions automatically and transparently. Each region is typically less than a gigabyte in size, so every server in a database cluster such as an HBase cluster is responsible for several hundred regions. Read and write requests are routed to the server currently hosting the target region.

FIG. 1 depicts read and write paths in an in-memory structure memory store or MemStore. The MemStore is a sorted map, per region, comprising all recently written data, and thus acts like an in-memory cache. Once a write request 150 from a client 105 reaches the correct region server 110, the new data is added to a MemStore 130 of the target region 120. As memory is a finite resource, the region server 110 carefully accounts memory usage and triggers a flush on a MemStore (e.g., 130) when the usage has crossed a threshold. The flush 125 writes the data to disk and frees up the memory. In one implementation, data from the MemStore 130 is flushed into HFile 140 that is written to a distributed file system (DFS) such as the Hadoop Distributed File System (HDFS) 135.

Data stored in MemStore is stored in volatile memory. If the system fails, the data in the MemStore is lost. To mitigate this risk, HBase saves updates in a write-ahead-log (WAL) 145 before writing the data to MemStore. If the region server fails, information that was stored in that server's MemStore can be recovered from its WAL.

When data is being read, in response to a read request 160 from a client 155, for example, the HBase first checks if the requested data is in MemStore and then checks HFiles in the HDFS 135. HBase then returns merged result to the client 155.

Measuring Fragmentation

In databases such as HBase, by setting CMSInitiatingOccupancyFraction tunable parameter lower, some garbage collection problems can be remedied. However, the tuning parameter is not applicable for all workloads. For example, in some workloads, no matter how low the tuning parameter is set, the garbage collection remains an issue. Furthermore, the long collection pauses occur even when metrics and logs indicate that the heap has several GB of free space. Thus some collection pauses are caused by heap fragmentation, rather than some kind of memory leak or improper tuning.

Heap fragmentation can be measured using one or more metrics. For example, the OpenJDK source code includes a parameter –XX:PrintFLSStatistics=1 which, when combined with other garbage collection logging options, causes the CMS collector to print statistical information about its free space before and after every collection. Example metrics in the statistical information include, free space, num chunks and max chunk size. The free space metric provides the total amount of free memory in the old generation, the num chunk metric provides the total number of non-contiguous free chunks of memory and the max chunk size provides the size of the largest one of the chunks (i.e., the biggest single allocation that can be satisfied without a pause).

In one implementation, an experiment can be designed to verify that pauses are the result of heap fragmentation. In the experiment, a cluster can be started with the print option enabled to run, for example, the following three separate stress workloads against the cluster using a benchmarking tool (e.g., such as the Yahoo Cloud Serving Benchmark (YCSB)):

1. Write-only: writes rows with 10 columns, each 100 bytes, across 100M distinct row keys.
2. Read-only with cache churn: reads data randomly for 100M distinct row keys, so that the data does not fit in the least recently used (LRU) cache.
3. Read-only without cache churn: reads data randomly for 10K distinct row keys, so that the data fits entirely in the LRU cache.

Each workload is run at least an hour, so good data about the garbage collection behavior under that workload can be collected. In addition to verifying that pauses are caused by fragmentation, the experiment can also be used to determine whether the pauses are caused by the read path (including the LRU cache) or the write path (including the MemStores for each region).

Figure 2A:
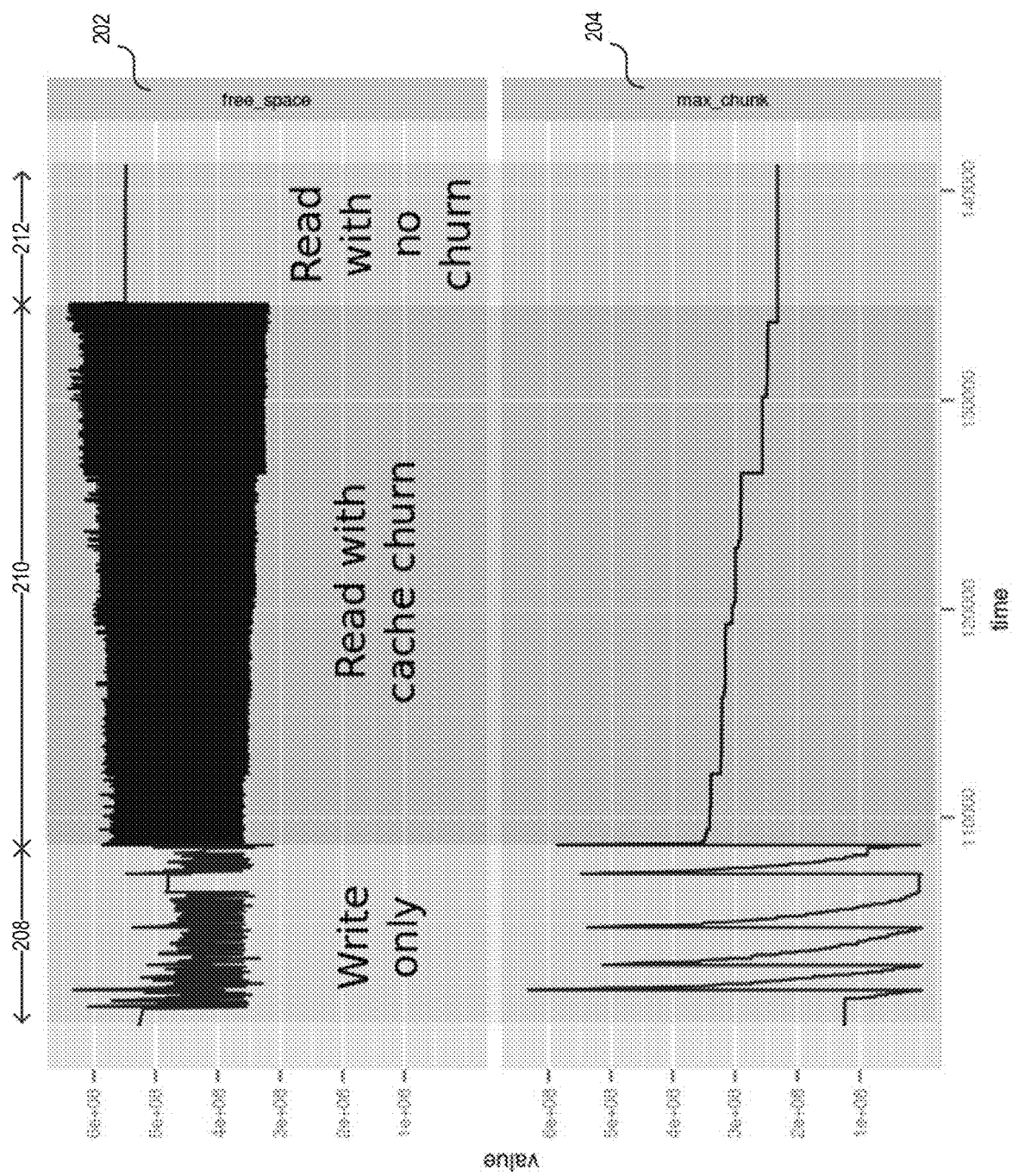
FIGS. 2A-C depict graphs illustrating example memory characteristics of a server in distributed database system running under various work load types.

The results from running the three different types of workloads can be parsed and reformatted into a suitable format such as a TSV file using a Python script. The results can be graphed using any graphing library such as ggplot2. FIG. 2A depicts two graphs generated by plotting the extracted results. The top graph shows free_space 202 which is the total amount of free space in the heap. The bottom graph shows max_chunk 204 which is the size of the largest chunk of contiguous free space. The x-axis is time in seconds, and the y-axis has units of heap words. The test is performed on a 64-bit Java virtual machine (JVM), and as a result, a word is 8 bytes in this example. As seen from the graphs, each of the workload types (i.e., write only 208, read with cache churn 210 and read with no churn 212) have different memory characteristics.

Figure 2B:
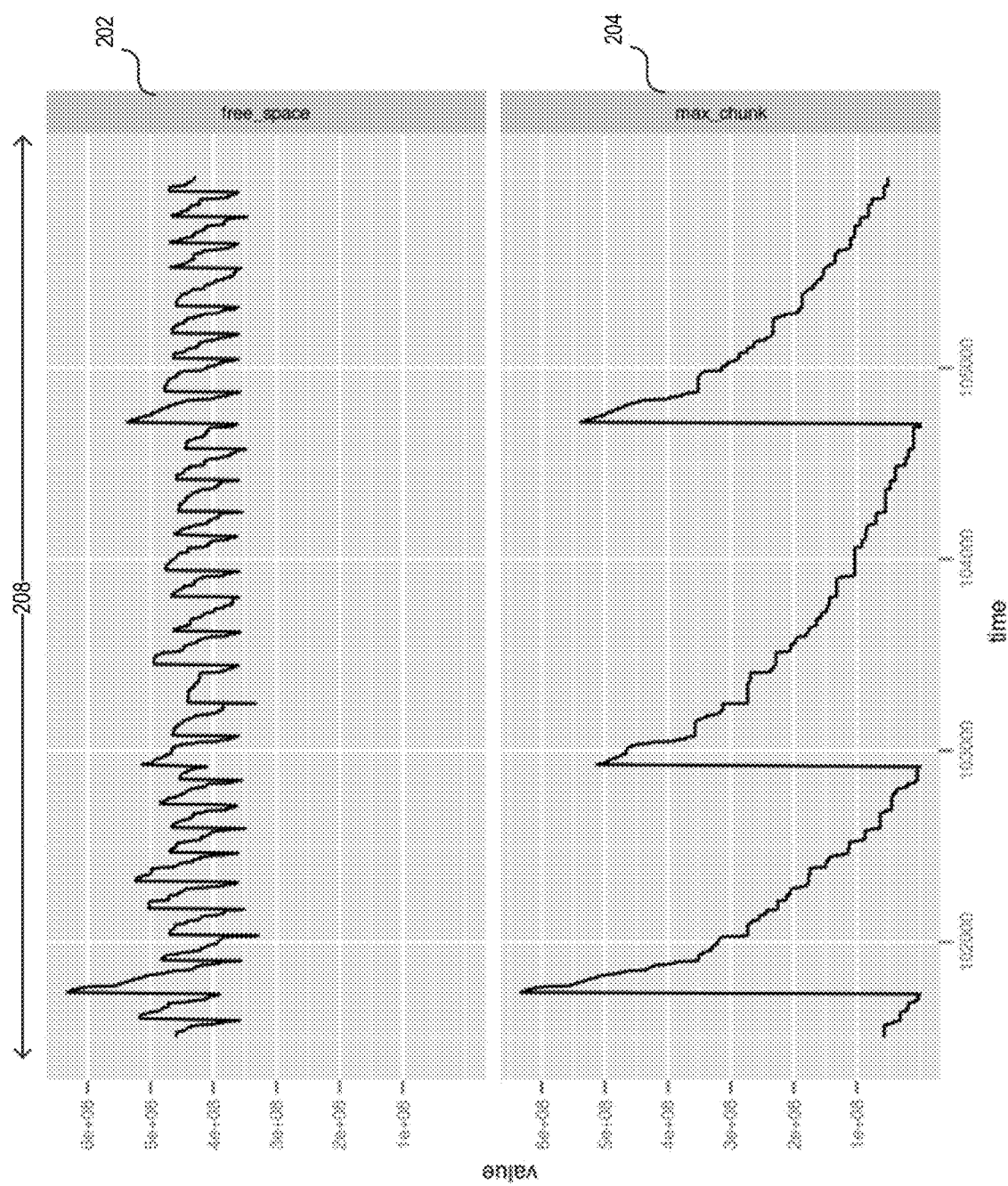

FIG. 2B depicts the two graphs of FIG. 2A zoomed in to show the memory characteristics of the write only region 208. The write only 208 workload type has two patterns. The top graph of free_space 202 shows a fluctuation between about 350 megawords (2.8 GB) and 475 megawords (3.8 GB). Each time the free space hits 2.8 G, the CMS collector kicks in and frees up about 1 GB of space. This shows that the CMS initiating occupancy fraction has been tuned to a low enough value, and there is always a significant amount of free space in the heap. It can also be seen that there are no memory leaks since the heap usage keeps a fairly consistent profile over time and does not trend in any direction.

Although the CMS collector kicks in to free up heap, the bottom graph of max_chunk 204 is seen to drop precipitously nearly down to 0. Each time it approaches or reaches 0 (e.g., at around t=102800), a sharp spike brings the max_chunk level back up to a large value.

By correlating this graph with the garbage collection logs, it can be seen the long full garbage collections correspond to the vertical spikes in the bottom graph of max_chunk 204. After each of these full garbage collections, the heap is defragmented, so all of the free space remains in one large chunk. Therefore, the write load causes heap fragmentation and that the long pauses occur when there are no large free chunks left in the heap.

Figure 2C:
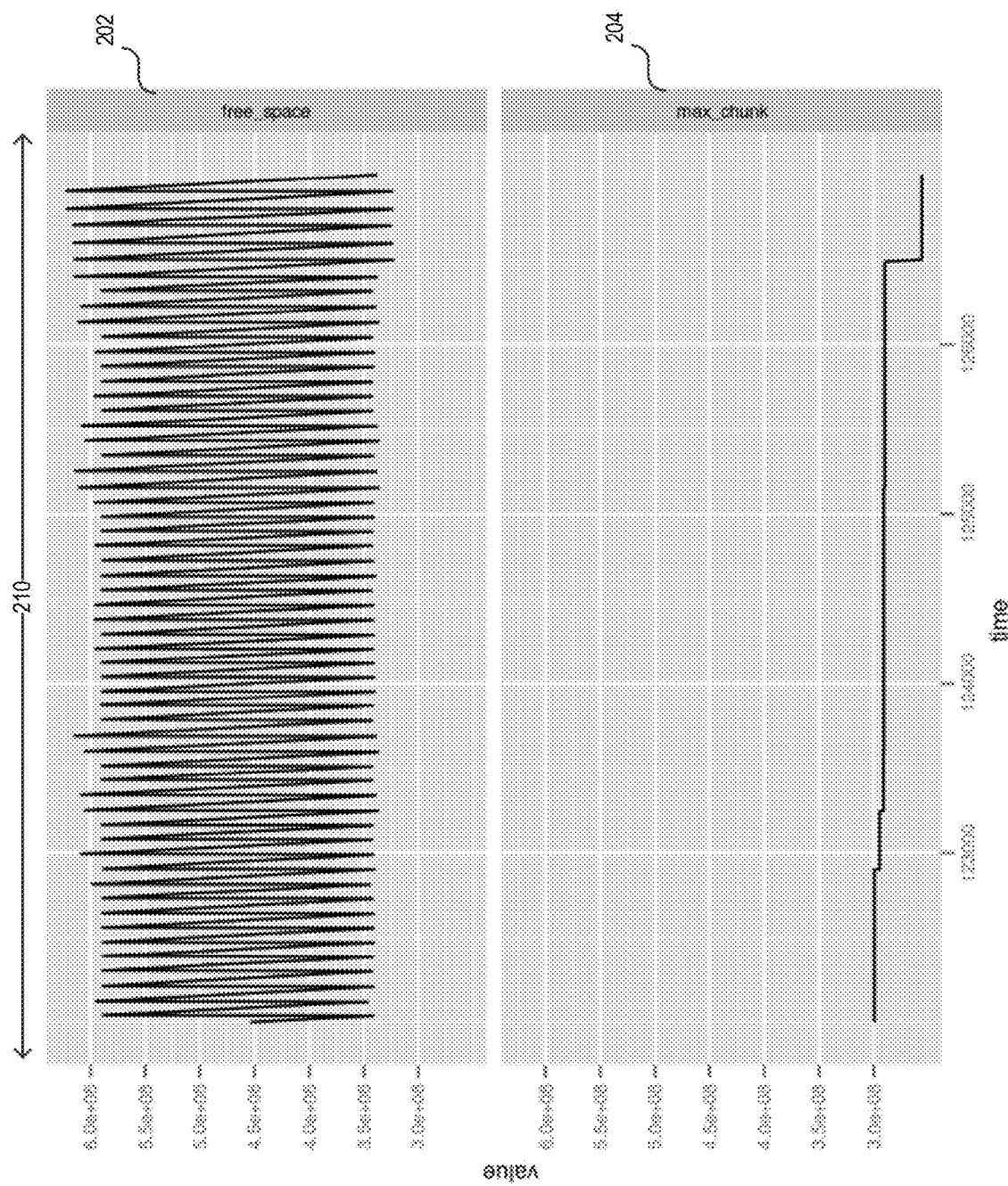

FIG. 2C depicts the two graphs of FIG. 2A zoomed in to show the memory characteristics for the read-only workload with cache churn region 210. For workload 210, the clients perform only reads, and the set of records to be read is much larger than the size of the LRU block cache. So, a large amount of memory churn can be seen as items are pulled into and evicted from the cache.

The top graph of free_space 202 reflects this large amount of memory churn. The graph of free_space 202 shows much more frequent collections than the write-only workload 208. However, the graph of max_chunk 204 stays approximately constant around its starting value. These memory characteristics indicate that the read-only workload 210 does not cause heap fragmentation as severely as the write workload 208, even though the memory churn from the read-only workload 210 is much higher.

Referring to FIG. 2A, for read-only workload without cache churn 212, the only allocations performed are short-lived objects for servicing each RPC request, since there is no cache churn. Hence, the objects do not get promoted to the old generation, and both free_space and max_chunk time series remain entirely constant as shown.

Based on the experiment results, the full garbage collections that are to be eliminated are the ones due to fragmentation, and not concurrent-mode failure. The write-only workload causes more fragmentation than either of the read-only workloads.

MemStore Fragmentation

Figure 3:
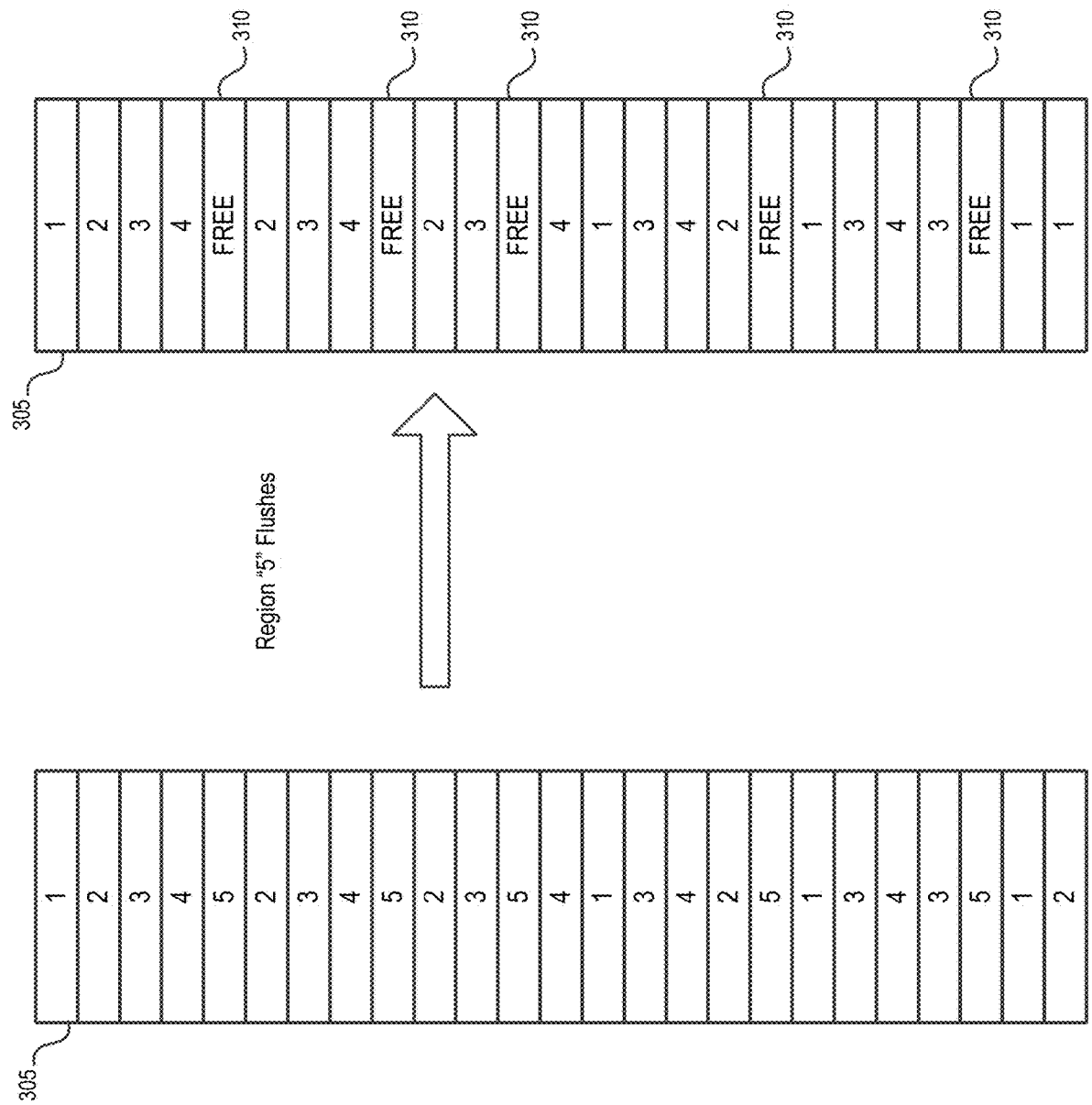
FIG. 3 depicts diagrams of an old generation in a region server before and after a flush.

FIG. 3 depicts diagrams of an old generation in a region server hosting regions 1-5 before and after a flush. The region server is subjected to a random write workload where the writes are spread evenly across the regions and arrive in no particular order. As the writes come in, new buffers are allocated for each row, and the buffers are moved into the old generation, since they stay in the MemStore for several minutes waiting to be flushed. Since the writes arrive in no particular order, data from different regions are intermingled in the old generation 305. When one of the regions, region 5 for example, is flushed, bits and pieces of the heap, instead of any large contiguous chunks, are freed up. The freed bits and pieces are depicted as "FREE" areas 310 in the heap in FIG. 3. Thus, the write workload causes severe fragmentation in the old generation, leading to a full garbage collection pause.

MemStore-Local Allocation Buffers

In one embodiment, in manual memory management, arena allocation allows every allocation to be associated with a larger area of memory called an arena, which is divided up into smaller pieces as memory is allocated. The arena allocation is applied in the thread-local allocation buffer (TLAB). In TLAB, each execution thread has its own memory arena, and all allocations done by that thread come from its own arena. Since allocation is performed by a single thread from this arena, no locks or atomic operations may be required. This can be referred to as bump-the-pointer allocation. The TLAB can maintain a single start pointer, and allocations are performed, in one embodiment, by incrementing it forward by some number of bytes.

The TLABs used in the JVM generally do not help solve the fragmentation issue experienced by databases such as HBase. This is because an individual handler thread in databases such as HBase actually handles requests for different regions throughout its lifetime. So, even though the allocations come from a single thread-local arena, data for different MemStores are intermixed within the TLAB. When the memory is promoted or tenured to the old generation, the data remains intermingled.

The MemStore-Local Allocation Buffer (MSLAB) provides an efficient allocation of data that prevents memory fragmentation. Whenever a request thread needs to insert data into a MemStore, instead of allocating the space for that data from the heap at large, the space from a memory arena is dedicated to a target region.

Allocating data for each region from the same area in the heap has several advantages. For example, data for different MemStores are not intermingled near each other. When a MemStore is flushed, the entire arena is freed up, thereby creating a large free chunk in the old generation. The large free chunk reduces fragmentation and solves the garbage collection pause. The implementation of the MSLAB also benefits from CPU cache locality within a region. In databases such as HBase, the read operations target individual regions at a time, and often need to sort or search through data in a single MemStore. By moving the bits of data for a MemStore to be near each other, CPU cache locality is improved, leading to a better performance.

Standard Java does not provide the ability to allocate objects from memory arenas. In Java, memory is allocated to objects and explicit allocation of memory is generally not allowed whereas creation of new objects is for such purpose may be allowed. However, in databases such as HBase, data objects are not large in size or number. For example, in HBase, each piece of data consists of a single KeyValue object which is not large. Additionally, each object is exactly the same size, and does not cause significant fragmentation. Rather, it's the byte[ ] arrays referred to by the KeyValue objects that cause the fragmentation. When byte[ ] arrays are allocated from MSLABs, instead of the heap, fragmentation is reduced.

Figure 4:
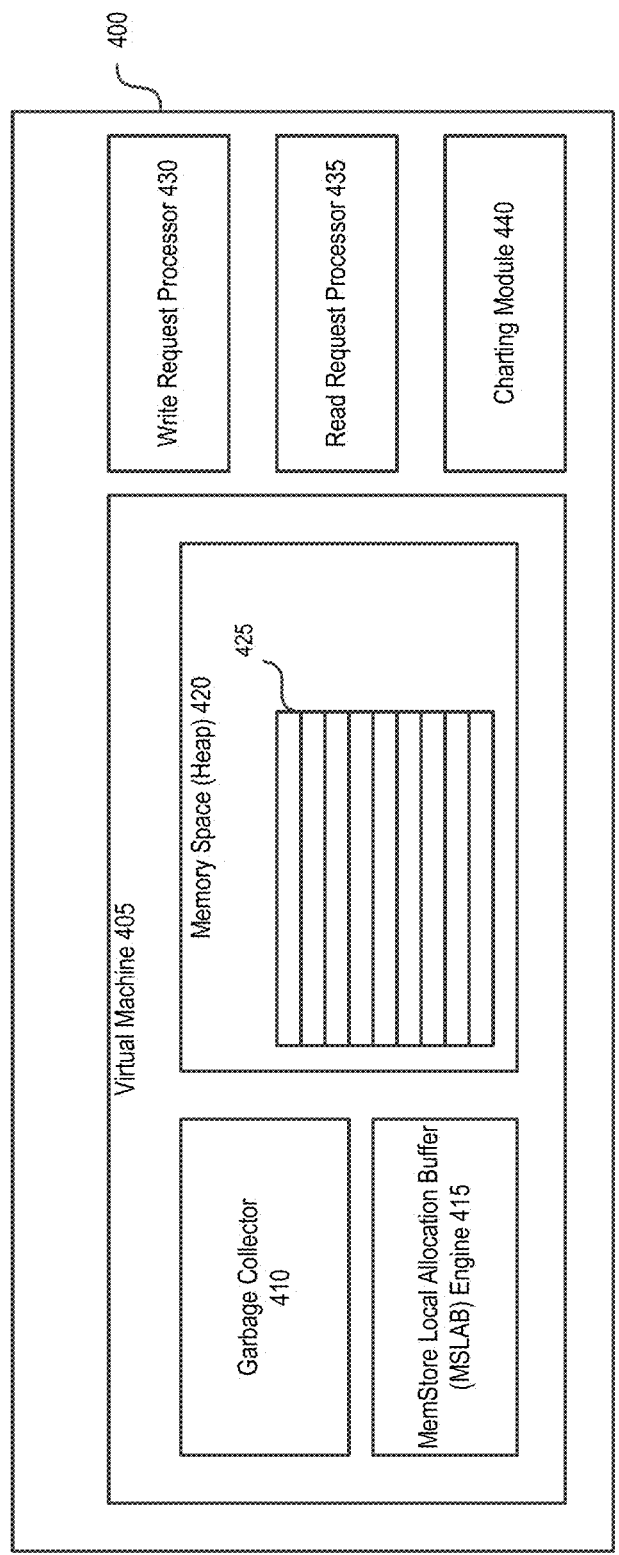
FIG. 4 depicts example components including the MSLAB in a system for allocating data from memory arenas to reduce heap fragmentation.

FIG. 4 depicts example components including the MSLAB in a system for allocating data from memory arenas to reduce heap fragmentation. The system 400 can be a part of the region server 110 illustrated in FIG. 1. The system 400 includes a virtual machine 405 that is a run time environment. The virtual machine 405 may be a Java Virtual Machine (JVM) such as the JRockit JVM, Oracle Java 6 JVM, and the like. The JVM includes, or has access to a memory space, also called heap, 420. The heap 420 includes objects and pointers 425 for the application being run on JVM. Objects created in the heap are divided into "young" generation and "old" or "tenured" generation according to object age, and are subject to different garbage collection policies.

The system 400 also includes a daemon thread garbage collector 410. The garbage collector 410 uses different garbage collection methods and/or systems that operate on young and/or old or tenured generations. As previously described, the parallel new collector method and/or system operates in the young generation and the CMS collector method and/or system works in the old generation.

The system 400 includes an MSLAB engine 415 that implements a process for allocating data from a memory arena instead of a heap to reduce fragmentation, and reduce garbage collection pauses or delays. It should be noted that the KeyValue class comprises a byte[ ] and an offset field pointing into the byte array. Data for different KeyValue objects can be placed near each other, by taking slices of a larger byte[ ] representing the MSLAB arena. Each MemStore has an instance of a new class MemStoreLAB. The MemStoreLAB retains a structure called curChunk which can include, for example, a 2 MB byte[ ] and a nextFreeOffset pointer starting at 0. The size of the byte array is a tunable parameter that can be optimized and configured or reconfigured. When a KeyValue that points to some byte[ ] is about to be inserted into the MemStore, it is first copied into curChunk and the nextFreeOffset pointer is bumped by the length of the new data. The KeyValue pointing inside curChunk instead of the original data is inserted. Should the 2 MB chunk fill up, a new one can be allocated from the JVM 420 using a method such as: new byte[2*10241*1024].

The efficiency of the allocation process may be improved by implementing the disclosed process in lock-free, using atomic compare-and-swap operations on the nextFreeOffset pointer and the curChunk structure.

The system 400 may also include a write request processor 430, a read request processor 435 and a charting module 440. The write request processor 430 directs the write requests to specific regions based on row keys. Example write requests can include put or delete requests. The changes are written to the write ahead log, and then to the MemStore at the allocated arena. The read request processor 435 handles read requests. For example, the read request processor can first check if the requested data is in MemStore, and then check the HFiles on disk. The read request processor 435 may then respond to the request by providing results from the MemStore and/or the HFiles on the disk.

The charting module 440 may be used to parse, extract and plot in graphs or other table formats various parameters such as free space in old generation, num chunk, max chunk size, and the like. It should be noted that more or less components may be present in the system 400. For example, one or more components may be consolidated into a single component.

Figure 5:
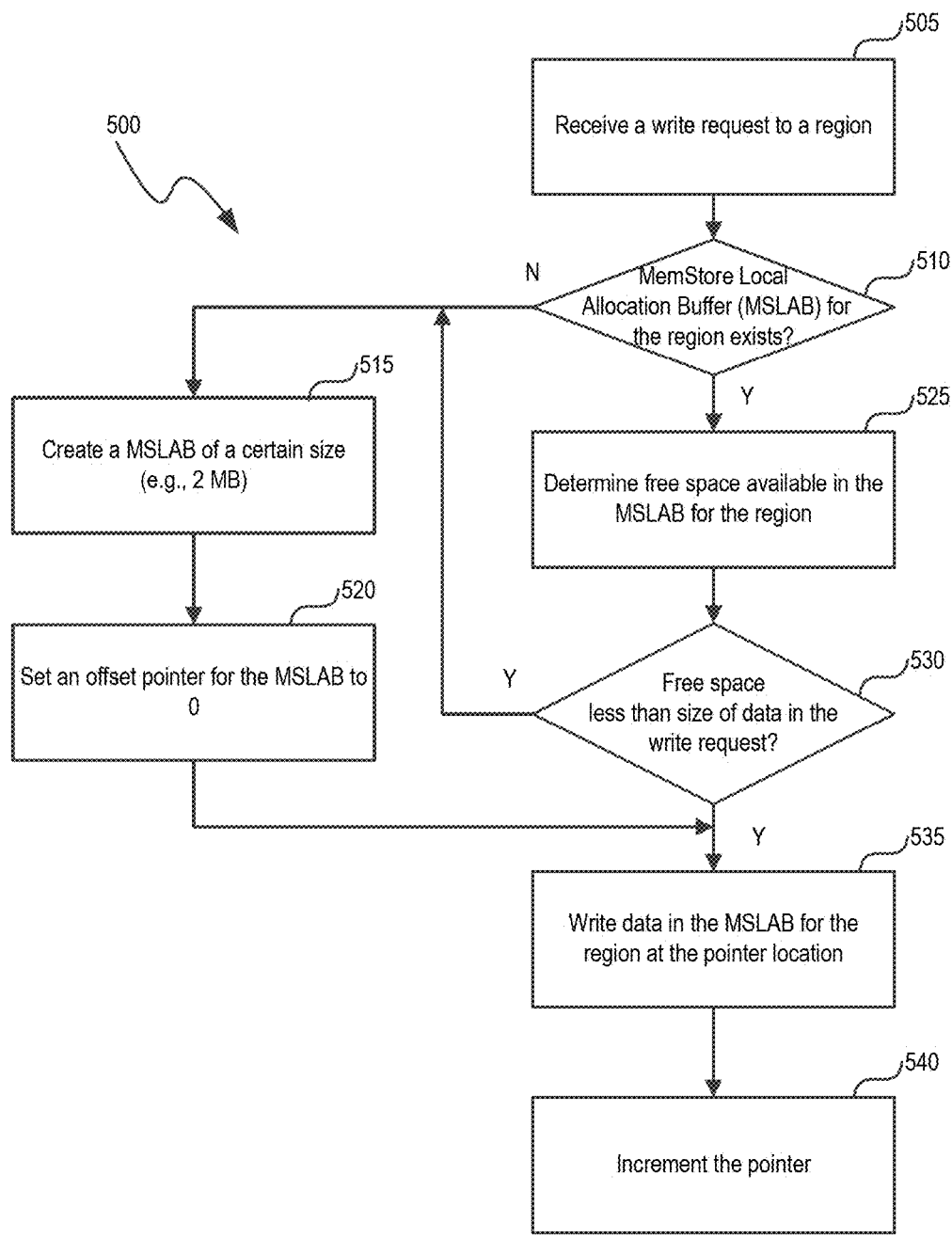
FIG. 5 depicts an example method of implementing a MemStore Local Allocation Buffer (MSLAB) for allocating data to reduce heap fragmentation.

FIG. 5 depicts an example method of implementing MSLAB for allocating data to reduce heap fragmentation. The example method 500 may be implemented by the MSLAB engine 415 in one implementation. At block 505, a write request is received at a region server. The write request is targeted to a specific region. At decision block 510, a check may be performed to determine if an MSLAB for the region exists. If there is no MSLAB for the region, an MSLAB of a certain size is created at block 515. In one implementation, the MSLAB may have a size of 0.5 MB, 1 MB, 2 MB, 4 MB, 8 MB and the like. In another implementation, the size of the MSLAB may be tuned using various heuristics. For example, the size may be tuned based on work load size or type. In some implementations, a combination of Java mechanism and the MSLAB mechanism may be used to reduce the waste of memory. At block 520, an offset pointer for the MSLAB is set to 0. If there is an MSLAB for a region, at block 525, the free or available space available in the MSLAB for the region can be determined. At decision block 530, if the free space is less than the size of data in the write request, a new MSLAB may be created at block 515. Alternately, if the free space available is sufficient, at block 535, the data in the write request is written in the MSLAB for the region at the pointer location. At block 540, the pointer location is incremented by the length of the new data.

In one embodiment, each region is allocated a minimum amount of memory usage (e.g., 0.5 MB, 1 MB, 2 MB, or others) on the region server. As a result of the allocations, a server hosting thousands of regions could have several GB of wasted memory sitting in unused allocation buffers. In some instances, a heuristic method or technique may be implemented to automatically tune and dynamically adjust the chunk size and avoid the waste.

Figure 6:
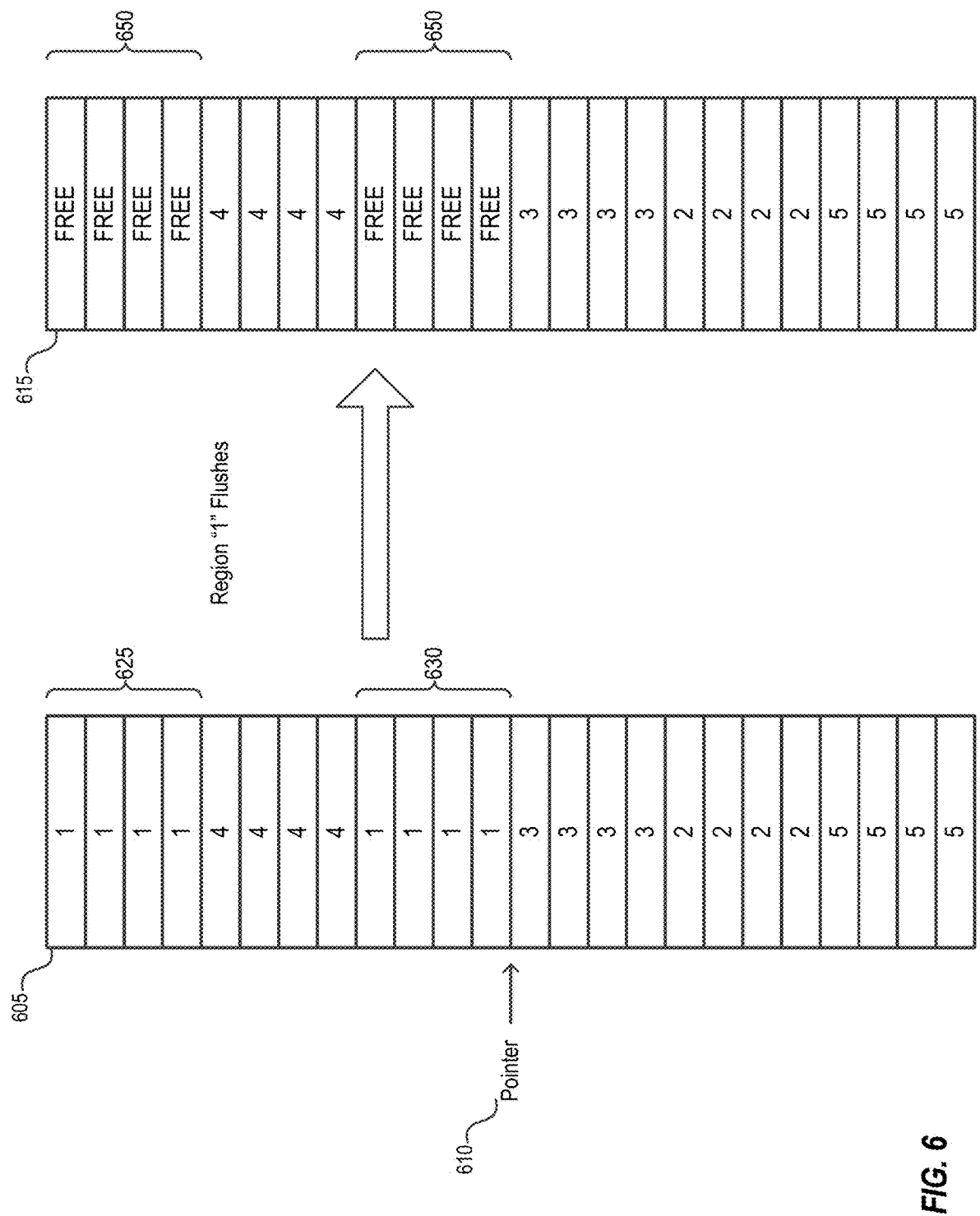
FIG. 6 depicts diagrams of an old generation of a region server implementing MSLABs before and after a flush.

FIG. 6 depicts diagrams of an old or tenured generation of a region server hosting regions 1-5 and implementing MSLABs before and after a MemStore flush. As shown, MSLABs allocate chunks or blocks of heap 605 for each region or MemStore. The chunks can vary in size. For example, a chunk can be 2 MB, 4 MB, 8 MB, etc. Data from each region can then remain together in the allocated chunks. A pointer 610 tracks the filling of the chunks. The original data to be inserted becomes very short-lived and dies in the young generation. The only data in the old generation stay together in the allocated chunks. For example, data from region 1 remain together in chunks 625 and 630. Each chunk only belongs to one MemStore. In FIG. 6, chunks 625 and 630 form parts of the MemStore for region 1. When region 1 MemStore is flushed, the chunks 625 and 630 are freed up as indicated by regions 650 marked "FREE" in heap 615.

Figure 7A:
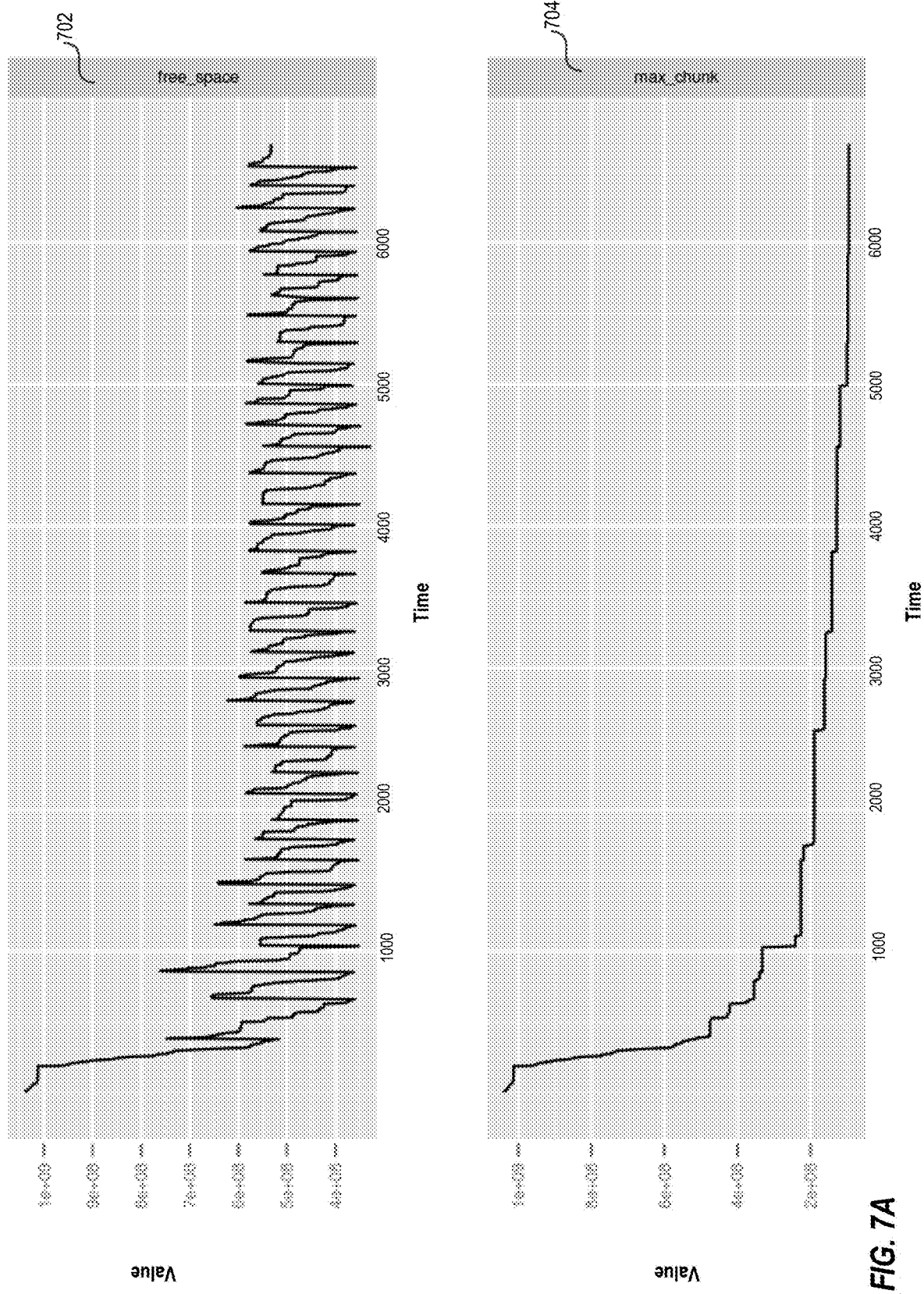
FIGS. 7A-B depict graphs illustrating example memory characteristics of a server in distributed database system running under various work load types using MSLABs for allocating data to reduce heap fragmentation.
Figure 7B:
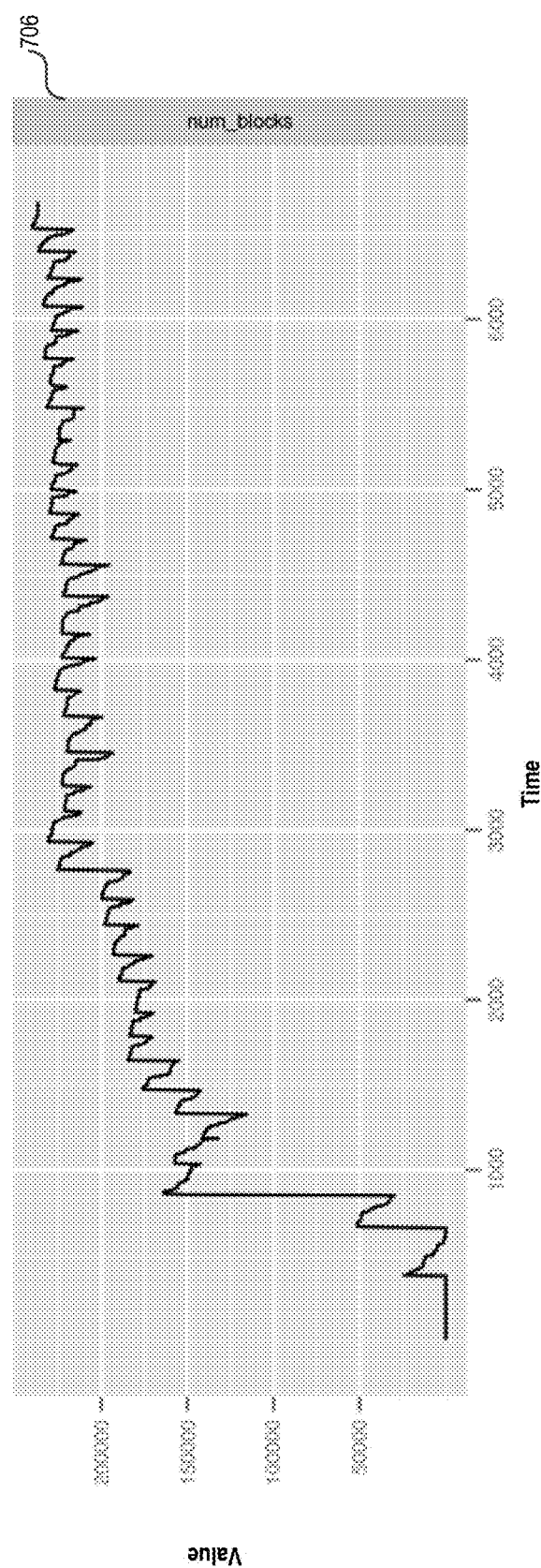

When the MSLABs are implemented, fragmentation is significantly reduced because MSLAB moves all MemStore allocations into contiguous chunks of a predefined size in the old generation. Because of the reduced fragmentation, garbage collection pauses are reduced in length and/or frequency or eliminated entirely. FIGS. 7A-B depict graphs generated by plotting results extracted from running the same write workload and using the same testing methodology as used for FIGS. 2A-C, with MSLAB implementation. The top graph of FIG. 7A shows free_space 702 and the bottom graph shows max_chunk 704. The graph of FIG. 7B shows num_blocks, which is the total number of separate free chunks in the old generation. The x-axis is time in seconds, and the y-axis has units of heap words. Referring to FIG. 7A, the top graph shows the experiment beginning with an entirely empty heap when the Region Server is started, and continuing through about an hour and a half of write load. As before, the free_space graph fluctuates back and forth as the concurrent collector runs. The max_chunk graph drops quickly at first as memory is allocated, but then eventually stabilizes. Referring to FIG. 7B, the num_blocks metric also stabilizes after an hour or so of runtime.

In some implementations of databases such as HBase, the MSLAB allocation scheme may be enabled as default, while in other implementations, one or more flags may be configured to implement the MSLAB allocation scheme as depicted in Table 1 below.

TABLE 1

| Configuration | Description |
| --- | --- |
| hbase.hregion.memstore.mslab.enabled | set to true to enable the MSLAB allocation scheme |
| hbase.hregion.memstore.mslab.chunksize | The size of the chunks allocated by MSLAB, in bytes (default 2 MB) |
| hbase.hregion.memstore.mslab.max.allocation | The maximum size byte array that should come from the MSLAB, in bytes (default 256 KB) |

In some implementations, an extra memory copy of data is made when moving the data is moved into the MSLAB chunk. This can be eliminated for CPU improvement. In addition, the value of –XX:CMSInitiatingOccupancyFraction can be tuned to a higher value.

Figure 8:
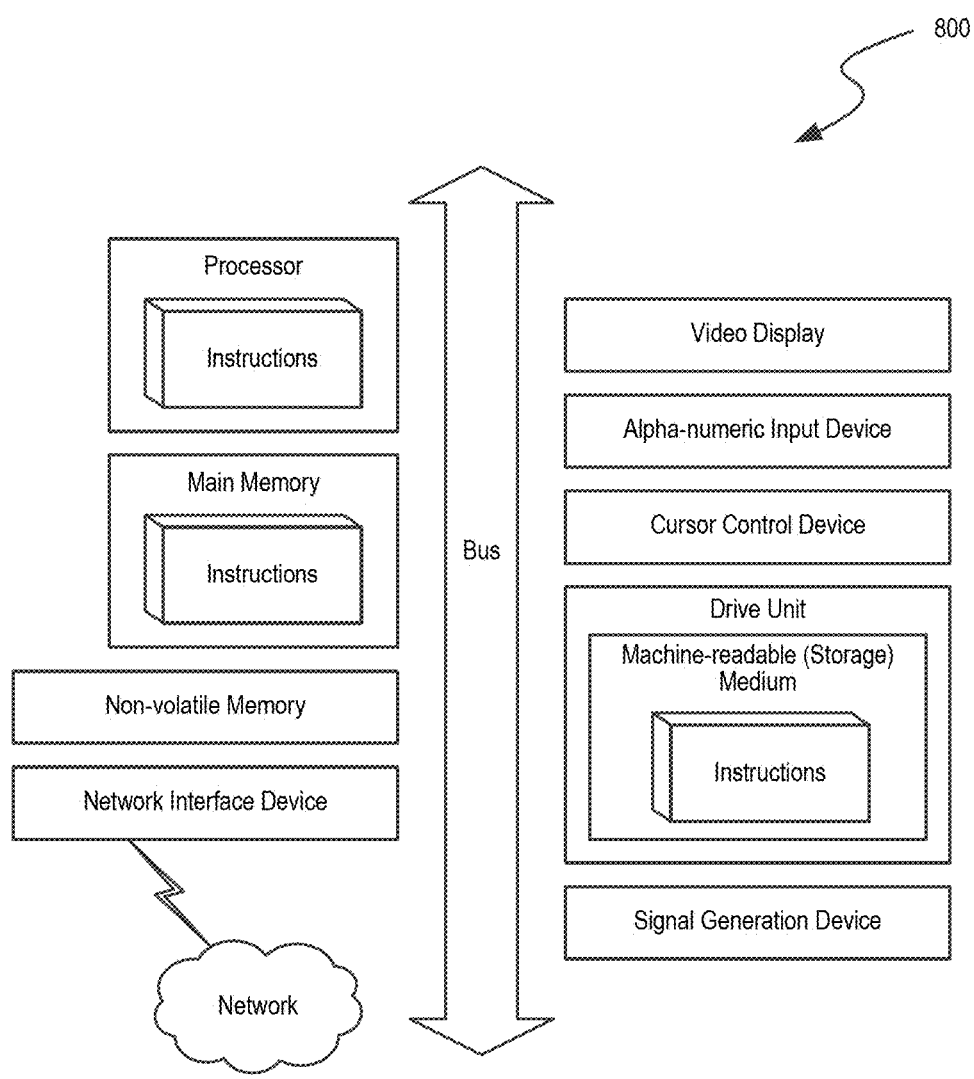
FIG. 8 depicts a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system within which a set of instructions, for causing the machine to perform any one or more of the methodologies discussed herein, may be executed.

In the example of FIG. 8, the computer system 800 includes a processor, memory, non-volatile memory, and an interface device. Various common components (e.g., cache memory) are omitted for illustrative simplicity. The computer system 800 is intended to illustrate a hardware device on which any of the components depicted in the example of FIG. 4 (and any other components described in this specification) can be implemented. The computer system 800 can be of any applicable known or convenient type. The components of the computer system 800 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows™ from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of methods and/or systems and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations, methods or processes leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The methods and/or systems and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disc Read-Only Memory (CD ROMS), Digital Versatile Discs, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. A method for operating a region server of a distributed computing system, the method comprising:
    tracking usage of a memory arena in a memory heap of the region server, the memory arena dedicated to a target region of the distributed computing system, wherein the memory arena is configured to utilize an offset pointer to track a previous end location associated with a previous write request so that a subsequent write request can continue data writing from the previous end location, and wherein the offset pointer is reset upon allocating a new chunk of blocks for the target region;
    determining, based on the tracking, that usage of the memory arena has reached a usage threshold; and
    flushing data from the memory arena to a storage in response to determining that usage of the memory arena has reached the usage threshold;
    wherein the memory arena is a contiguous portion of the memory heap such that when said flushing occurs data storage space freed from the memory arena is also contiguous.

2. The method of claim 1, wherein the usage threshold is based on a percentage of available space in the memory arena that is holding data to be written to the storage.

3. The method of claim 1, wherein the usage threshold is based on quantity of data held in the memory arena that is to be written to the storage.

4. The method of claim 1, wherein usage of the memory arena includes:
    holding, in the memory arena, data to be written to the storage, the data received as part of a write request from a client.

5. The method of claim 1, further comprising:
    receiving a write request from a client, wherein the write request includes a data object and indicates the target region; and
    storing, in response to the write request, the data object in data storage space from the memory arena that is dedicated to the target region at a location that is continued from the previous end location.

6. The method of claim 5, further comprising:
    incrementing the offset pointer by a length of the data object.

7. The method of claim 5, further comprising:
    before storing the data object in the memory arena;
    determining, based on the tracked usage, that the memory arena has sufficient space to store the data object.

8. The method of claim 1, further comprising:
    receiving a write request from a client, wherein the write request includes a data object and indicates the target region;
    determining, based on the tracked usage, that the memory arena has insufficient space to store the data object; and
    allocating a second memory arena for the target region in response to determining that the memory arena has insufficient space to store the data object;
    wherein the second memory arena is a second contiguous portion of the memory heap of the region server.

9. The method of claim 1, further comprising:
    receiving a read request from a client, the read request indicating a data object that was included in another previous write request from the client; and
    searching, in response to the read request, for the data object in the memory arena before searching for the data object in the storage.

10. The method of claim 1, wherein data is flushed from the memory arena to the storage periodically in response to determining that usage of the memory arena has reached the usage threshold.

11. The method of claim 1, wherein the target region is one of a plurality of regions hosted on the region server.

12. The method of claim 11, wherein each of the plurality of regions is associated with a different one of a plurality of memory arenas in the memory heap of the region server, the method further comprising:
    flushing data from each of the plurality of memory arenas to the storage in response to determining that usage of each of the plurality of memory arenas has reached the usage threshold.

13. The method of claim 1, wherein the distributed computing system is implemented as a non-relational, distributed database.

14. The method of claim 1, wherein the distributed computing system is an HBase cluster.

15. A server hosting a plurality of regions for a distributed computing system, the server including a memory storing instructions which, when executed by one or more processors of the server, cause the server to perform operations comprising:
    tracking usage of a memory arena in a memory heap of the server, the memory arena dedicated to a target region of the plurality of regions, wherein the memory arena is configured to utilize an offset pointer to track a previous end location associated with a previous write request so that a subsequent write request can continue data writing from the previous end location, and wherein the offset pointer is reset upon allocating a new chunk of blocks for the target region;

determining, based on the tracking, that usage of the memory arena has reached a usage threshold; and flushing data from the memory arena to a storage in response to determining that usage of the memory arena has reached the usage threshold;

wherein the memory arena is a contiguous portion of the memory heap such that when said flushing occurs data storage space freed from the memory arena is also contiguous.

16. The server of claim 15, wherein the usage threshold is based on a percentage of available space in the memory arena that is holding data to be written to the storage; or wherein the usage threshold is based on quantity of data held in the memory arena that is to be written to the storage.

17. The server of claim 15, the server's memory including further instructions which, when executed by the one or more processors of the server, cause the server to perform operations further comprising:

receiving a write request from a client, wherein the write request includes a data object and indicates the target region; and storing, in response to the write request, the data object in space from the memory arena that is dedicated to the target region at a location that is continued from the previous end location.

18. The server of claim 17, the server's memory including further instructions which, when executed by the one or more processors of the server, cause the server to perform operations further comprising:

incrementing the offset pointer by a length of the data object.

19. The server of claim 17, the server's memory including further instructions which, when executed by the one or more processors of the server, cause the server to perform operations further comprising:

before storing the data object in the memory arena;

determining, based on the tracked usage, that the memory arena has sufficient space to store the data object.

20. A non-transitory machine-readable storage medium including instructions which, when executed by one or more processors of a server hosting a plurality of regions for a distributed computing system, cause the server to perform operations comprising:

tracking usage of a memory arena in a memory heap of the server, the memory arena dedicated to a target region of the plurality of regions, wherein the memory arena is configured to utilize an offset pointer to track a previous end location associated with a previous write request so that a subsequent write request can continue data writing from the previous end location, and wherein the offset pointer is reset upon allocating a new chunk of blocks for the target region;

determining, based on the tracking, that usage of the memory arena has reached a usage threshold; and flushing data from the memory arena to a storage in response to determining that usage of the memory arena has reached the usage threshold;

wherein the memory arena is a contiguous portion of the memory heap such that when said flushing occurs space freed from the memory arena is also contiguous.

21. The non-transitory machine-readable storage medium of claim 20, wherein the usage threshold is based on a percentage of available space in the memory arena that is holding data to be written to the storage; or wherein the usage threshold is based on quantity of data held in the memory arena that is to be written to the storage.

22. The non-transitory machine-readable storage medium of claim 20 including further instructions which, when executed by the one or more processors of the server, cause the server to perform operations further comprising:

receiving a write request from a client, wherein the write request includes a data object and indicates the target region; and storing, in response to the write request, the data object in data storage space from the memory arena that is dedicated to the target region at a location that is continued from the previous end location.

23. The non-transitory machine-readable storage medium of claim 22 including further instructions which, when executed by the one or more processors of the server, cause the server to perform operations further comprising:

incrementing the offset pointer by a length of the data object.

24. The non-transitory machine-readable storage medium of claim 22 including further instructions which, when executed by the one or more processors of the server, cause the server to perform operations further comprising:

before storing the data object in the memory arena;

determining, based on the tracked usage, that the memory arena has sufficient space to store the data object.

* * * * *